(12) United States Patent
Shi et al.

(10) Patent No.: US 7,835,143 B2
(45) Date of Patent: Nov. 16, 2010

(54) HINGE APPARATUS FOR FOLDABLE ELECTRONIC DEVICE

(75) Inventors: Zheng Shi, Shenzhen (CN); Chih-Chiang Chang, Taipei Hsien (TW); Xiao-Liang Wei, Shenzhen (CN)

(73) Assignees: Shenzhen Futaihong Precision Industry Co., Ltd., ShenZhen, Guangdong Province (CN); Fih (Hong Kong) Limited, Kowloon (HK)

( * ) Notice: Subject to any disclaimer, the term of this patent is extended or adjusted under 35 U.S.C. 154(b) by 301 days.

(21) Appl. No.: 12/140,357

(22) Filed: Jun. 17, 2008

(65) Prior Publication Data

US 2009/0237871 A1   Sep. 24, 2009

(30) Foreign Application Priority Data

Mar. 19, 2008   (CN) .................. 2008 1 0300629

(51) Int. Cl.
*G06F 1/16* (2006.01)
(52) U.S. Cl. ............... 361/679.01; 361/679.27; 379/433.1; 16/303; 16/304
(58) Field of Classification Search .......... 361/679.27; 379/433.13
See application file for complete search history.

(56) References Cited

U.S. PATENT DOCUMENTS

| | | | | |
|---|---|---|---|---|
| 5,467,504 A * | 11/1995 | Yang | ............ | 16/342 |
| 5,715,576 A * | 2/1998 | Liu | ............ | 16/342 |
| 5,915,440 A * | 6/1999 | Repo | ............ | 16/330 |
| 5,966,776 A * | 10/1999 | Ona | ............ | 16/328 |
| 6,098,248 A * | 8/2000 | Saida et al. | ............ | 16/337 |
| 6,101,676 A * | 8/2000 | Wahl et al. | ............ | 16/342 |
| 6,408,485 B1 * | 6/2002 | Wu | ............ | 16/342 |
| 6,583,985 B2 * | 6/2003 | Nguyen et al. | ............ | 361/679.27 |
| 6,587,676 B1 * | 7/2003 | Oshima et al. | ............ | 455/575.1 |
| 6,609,273 B1 * | 8/2003 | Yamada et al. | ............ | 16/332 |
| 6,654,233 B2 * | 11/2003 | Tseng et al. | ............ | 361/679.27 |
| 6,950,686 B2 * | 9/2005 | Won | ............ | 455/575.3 |
| 7,085,375 B2 * | 8/2006 | Katoh | ............ | 379/433.13 |
| 7,334,297 B2 * | 2/2008 | Ma et al. | ............ | 16/348 |
| 7,383,618 B2 * | 6/2008 | Lu et al. | ............ | 16/330 |
| 7,438,573 B2 * | 10/2008 | Jao et al. | ............ | 439/165 |
| 7,533,444 B2 * | 5/2009 | Tu et al. | ............ | 16/283 |
| 7,567,829 B2 * | 7/2009 | Lai et al. | ............ | 455/575.3 |
| 7,676,889 B2 * | 3/2010 | Kim | ............ | 16/330 |
| 2002/0157213 A1 * | 10/2002 | Oshima et al. | ............ | 16/342 |
| 2003/0163901 A1 * | 9/2003 | Pan et al. | ............ | 16/342 |
| 2004/0237259 A1 * | 12/2004 | Huang et al. | ............ | 16/330 |
| 2006/0096064 A1 * | 5/2006 | Ma et al. | ............ | 16/303 |
| 2006/0160582 A1 * | 7/2006 | Jeun et al. | ............ | 455/575.1 |
| 2007/0151078 A1 * | 7/2007 | Kim et al. | ............ | 16/325 |
| 2008/0125197 A1 * | 5/2008 | Hongo et al. | ............ | 455/575.3 |
| 2008/0151478 A1 * | 6/2008 | Chern | ............ | 361/681 |
| 2008/0273297 A1 * | 11/2008 | Kumar | ............ | 361/680 |
| 2009/0007380 A1 * | 1/2009 | Feng et al. | ............ | 16/305 |

* cited by examiner

*Primary Examiner*—Jayprakash N Gandhi
*Assistant Examiner*—Anthony Q Edwards
(74) *Attorney, Agent, or Firm*—Steven M. Reiss

(57) ABSTRACT

A hinge apparatus includes a hinge assembly (30) and an enclosure (40). The hinge assembly includes a sleeve (31). The enclosure forms two elastic portions (46) therein. The hinge assembly is slidably received in the enclosure, and the sleeve is clamped between the elastic portions. The enclosure defines an opening (42) configured for exposing the hinge assembly from the enclosure.

9 Claims, 8 Drawing Sheets

HINGE APPARATUS FOR FOLDABLE ELECTRONIC DEVICE

BACKGROUND

1. Field of the Invention

The present invention relates to hinge apparatus and, particularly, to a hinge apparatus for foldable electronic devices such as mobile phones, foldable computers, and so on.

2. Description of Related Art

Foldable electronic device usually includes a body section, a cover section and a hinge assembly. The body section includes a barrel at one end thereof. The cover section includes two holding ends at one end thereof configured for engaging with the barrel of the body section. One of the holding ends defines a through hole, and the other end of the holding ends form an extending shaft. During assembly, the barrel of the body section is engaged with the two holding ends of the cover section. The extending shaft of the holding end is received in one end of the barrel, and the through hole of the holding end is aligned with the other end of the barrel. Then, the hinge assembly is received in the barrel through the through hole of the holding end, and one end of the hinge assembly is rotatably engaged in the holding end. Thus, the cover section is rotatably connected to the body section by means of the hinge assembly.

Since some electronic devices do not provide the through hole in the holding end, the hinge assembly has to be pressed in the barrel and the holding end to assemble the cover section and the body section together. This assembly method is more difficult, and may easily damage the hinge assembly.

Therefore, a new hinge apparatus is desired.

BRIEF DESCRIPTION OF THE DRAWINGS

Many aspects of the present hinge apparatus can be better understood with reference to the following drawings. The components in the drawings are not necessarily drawn to scale, the emphasis instead being placed upon clearly illustrating the principles of the present hinge apparatus. Moreover, in the drawings, like reference numerals designate corresponding parts throughout the several views, in which.

DETAILED DESCRIPTION OF THE EMBODIMENTS

The present hinge apparatus is suitable for foldable electronic devices such as a flip-type mobile phones, for pivotably coupling a cover section and a body section. It is to be understood, however, that the present hinge apparatus could be used in other environments.

Figure 1:
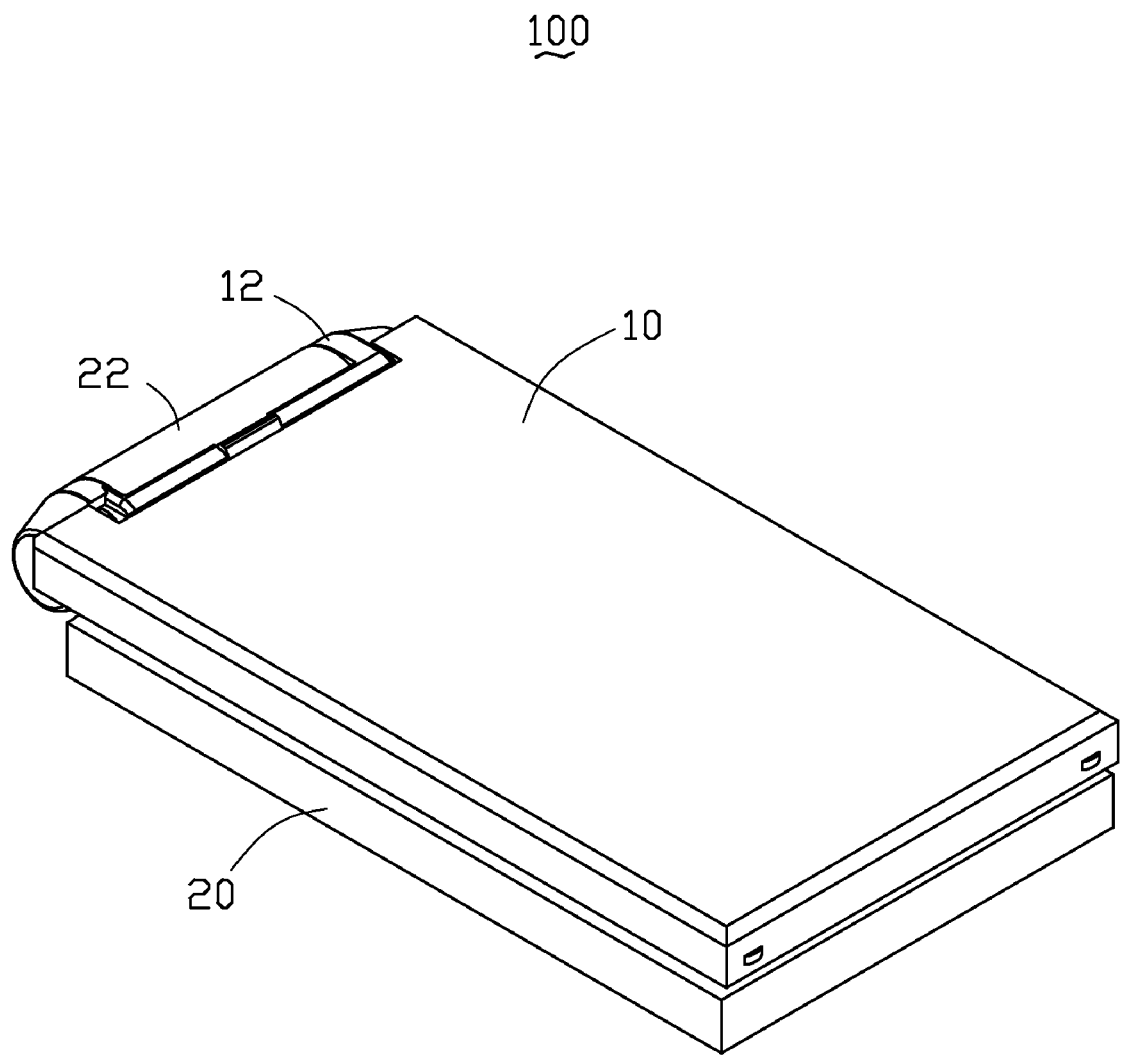
FIG. 1 is an assembled isometric view of a foldable electronic device, as used in a mobile phone.
Figure 2:
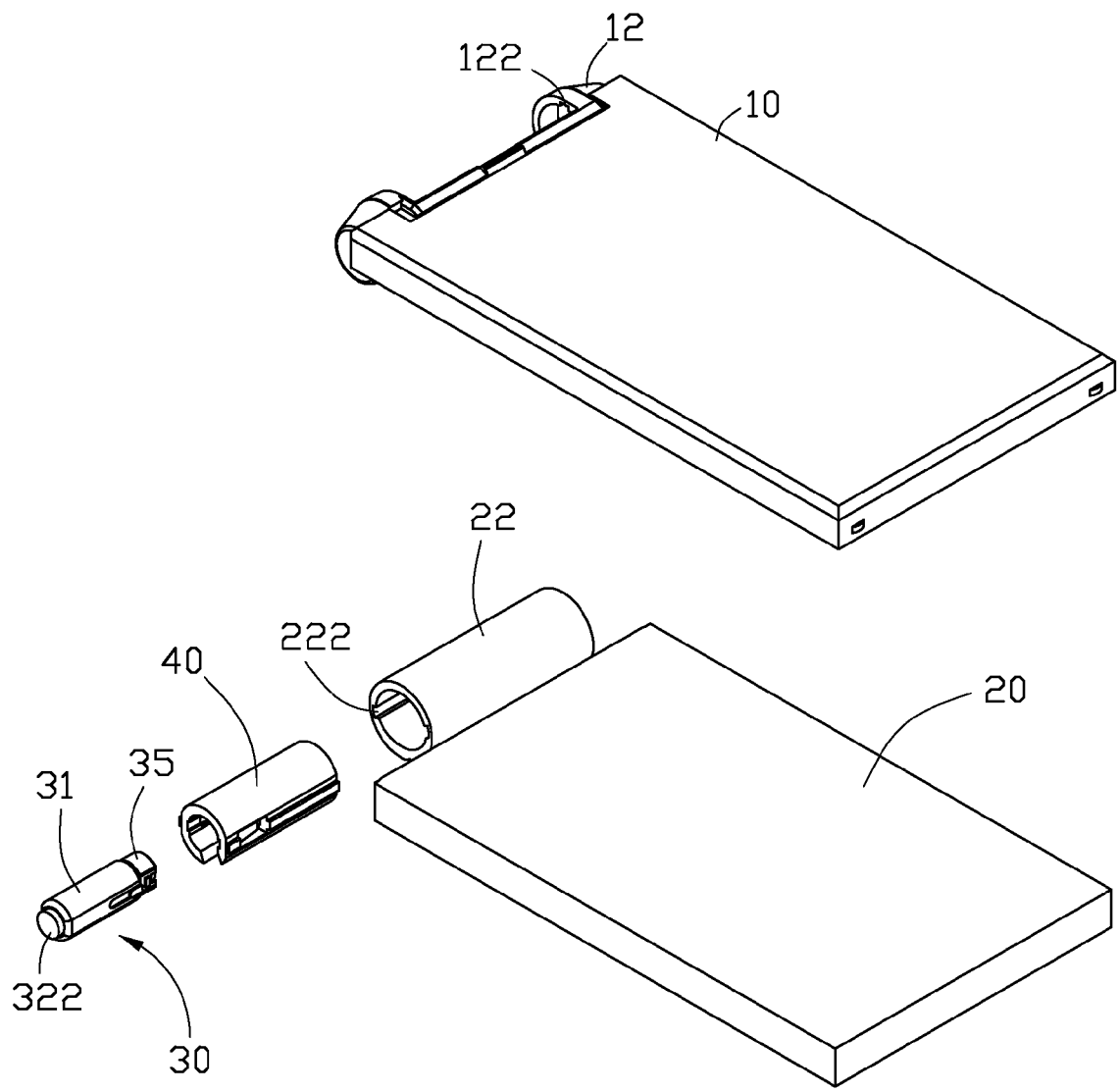
FIG. 2 is an exploded, isometric view of the foldable electronic device shown in FIG. 1.

Referring to FIGS. 1 and 2, the foldable electronic device 100 includes a cover section 10, a body section 20, a hinge assembly 30 and an enclosure 40. The hinge assembly 30 and the enclosure 40 cooperatively define a hinge apparatus used to connect the cover section 10 with the body section 20.

The cover section 10 has two holding ends 12 formed at one end thereof and opposite to each other. Each holding end 12 includes an opening end and a closed end. The opening end of one of the holding ends 12 defines a latching groove 122 at a peripheral wall thereof.

Figure 7:
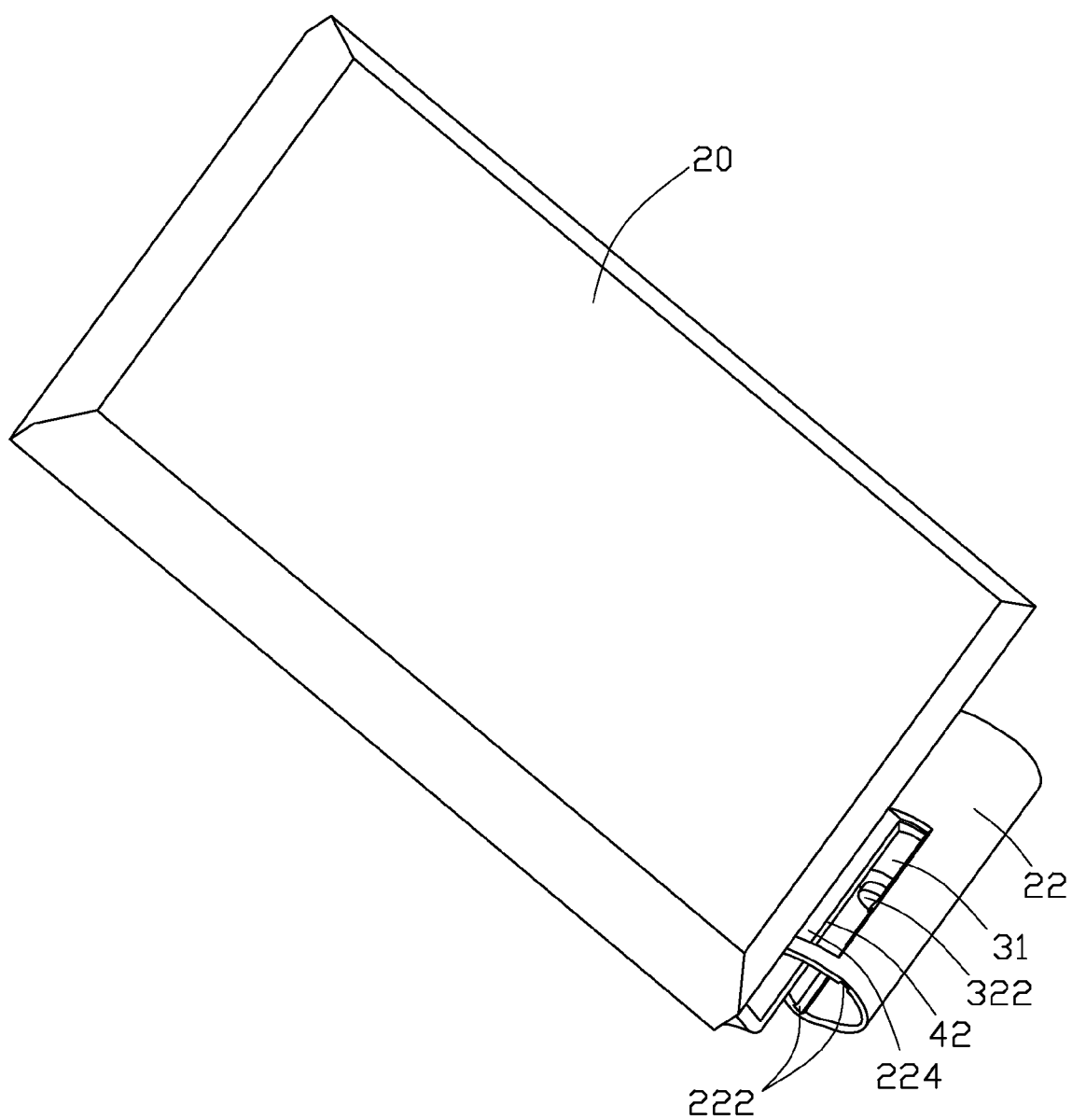
FIG. 7 is an assembled view of the hinge apparatus assembled in the barrel of the body section.

The body section 20 has a barrel 22 formed at one end thereof. The barrel 22 is substantially a hollow sleeve, and includes an inner and outer circumferential wall. The inner circumferential wall defines two symmetric slots 222 therein. Each of the slots 222 respectively extends the length of the barrel 22. Referring to FIG. 7, the barrel 22 defines a cutout 224 at one side, which communicates with the inner circumferential wall and the outer circumferential wall of the barrel 22.

Figure 3:
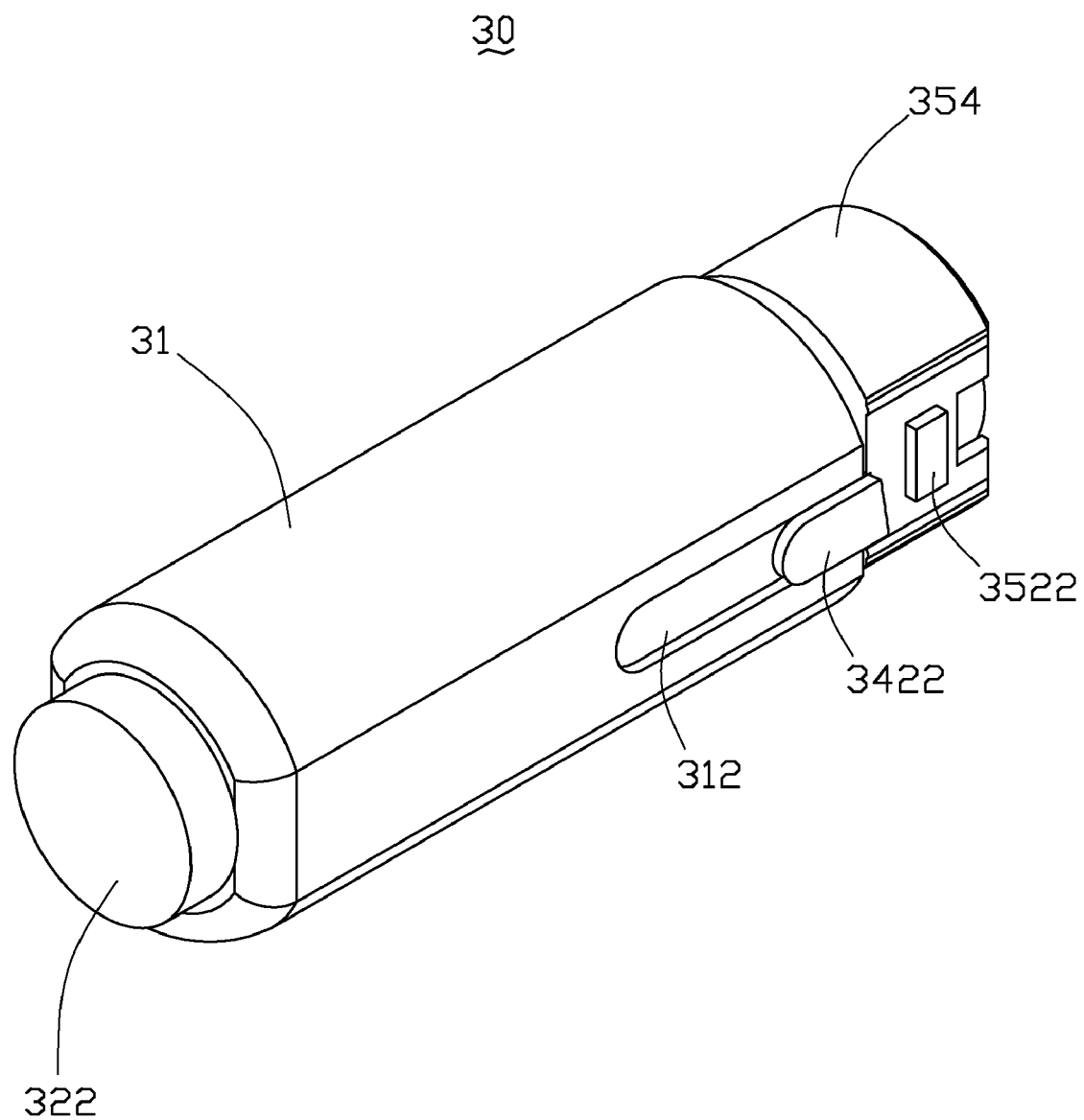
FIG. 3 is an assembled view of the hinge assembly shown in FIG. 2.
Figure 4:
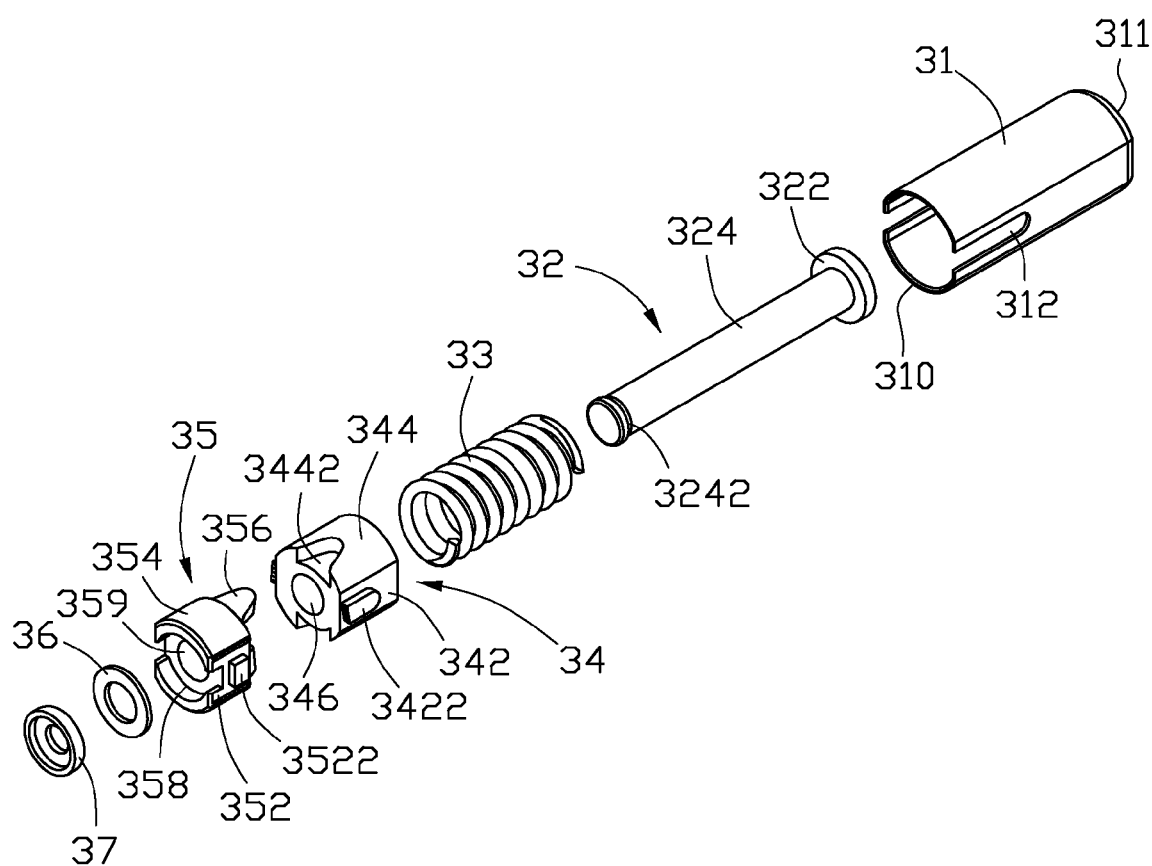
FIG. 4 is an exploded, isometric view of the hinge assembly shown in FIG. 3.

Referring now to FIGS. 3 and 4, the hinge assembly 30 includes a sleeve 31, a shaft 32, a spring 33, a cam 34, a follower 35, a washer 36 and a cap 37.

The sleeve 31 includes an open end 310 and a half-closed end 311. The sleeve 31 defines a pair of symmetric notches 312 at an outer peripheral wall thereof. Each notch 312 extends from the open end to a substantially middle position of the sleeve 31.

The shaft 32 includes a flange portion 322 and a shaft portion 324. A diameter of the flange portion 322 is larger than that of the shaft portion 324. The shaft portion 324 defines a ring groove 3242 at one end thereof opposite to the flange portion 322.

The cam 34 includes two opposite flat walls 342 and two opposite arcuate walls 344. The flat walls 342 and the arcuate walls 344 are alternately connected to each other. A protrusion 3422 respectively extends from the distal ends of each of the flat walls 342. One side of each of the arcuate walls 344 defines two symmetric recesses 3442 therein. The cam 34 has a through hole 346.

The follower 35 includes a peripheral surface 354. The peripheral surface 354 defines two symmetric flat surfaces 352. A rectangular projection 3522 radially extends outwardly from each flat surface 352. Two arms 356 axially extend from one end of the follower 35. The configuration of the arms 356 matches that of the recesses 3442 to allow the arms 356 to engage in corresponding recess 3442 of the cam 34. A receiving groove 358 is defined in the follower 35 opposite to the arms 356. The follower 35 has a through hole 359 defined in a central portion thereof.

The washer 36 is O-shaped and is received in the receiving groove 358. The cap 37 is substantially a hollow disk for being locked in the ring groove 3242.

Figure 5:
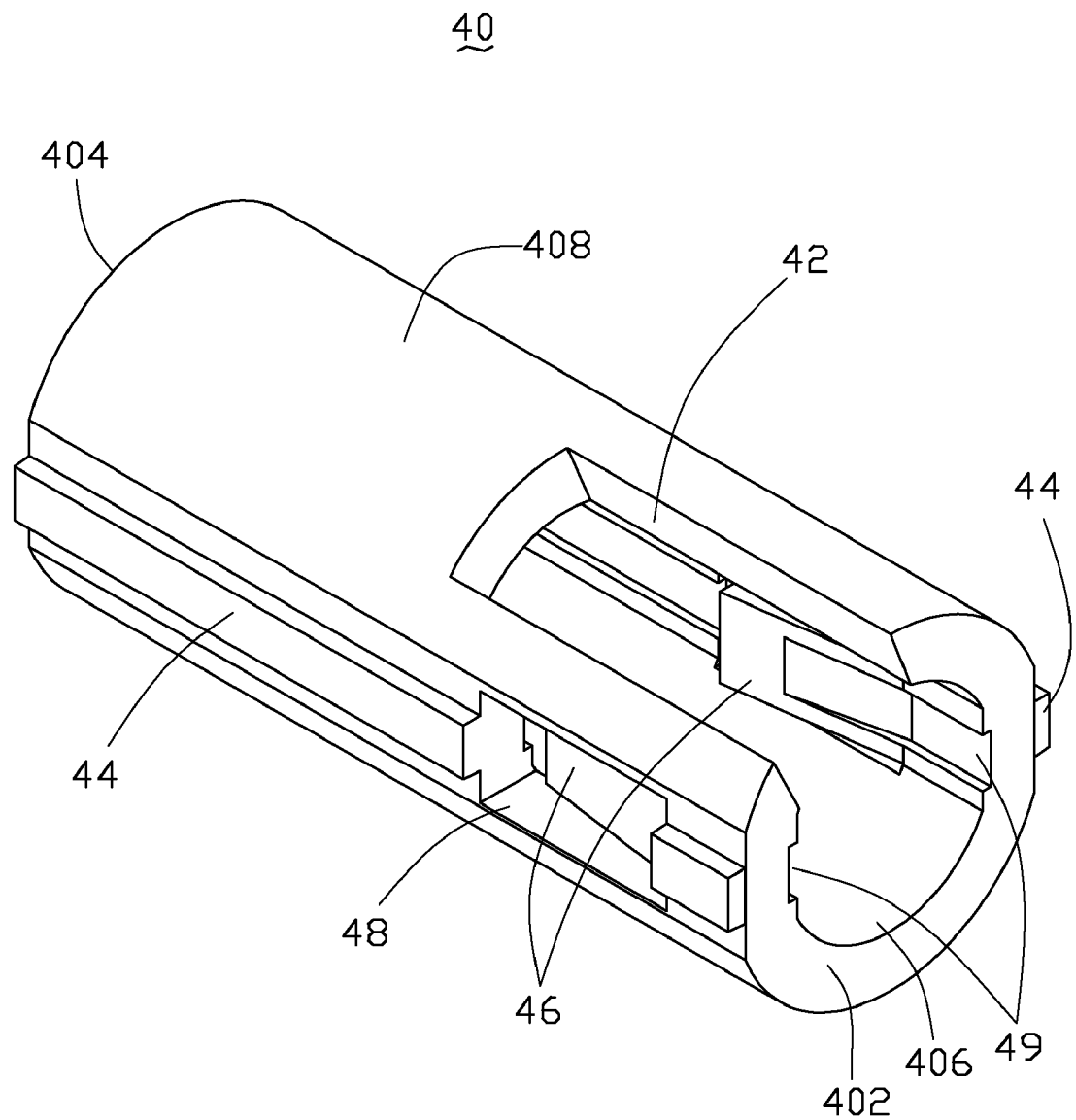
FIG. 5 is an enlarged, isometric view of the enclosure of FIG. 2.

Referring to FIG. 5, the enclosure 40 has a first open end 402, a second open end 404, and includes inner 406 and outer walls 408. The enclosure 40 defines an opening 42 extending towards the middle of the enclosure 40 from the first open ends 402. The opening 42 communicates with the outer wall 408 and the inner wall 406 of the enclosure 40. A width of the opening 42 is about the same as the width of the cutout 224. The enclosure 40 forms two symmetric blocks 44 along the outer wall thereof. Each blocks 44 extends along the length of the enclosure 40. The inner wall 406 of the enclosure 40 defines two guiding grooves 49 corresponding to the two blocks 44. The enclosure 40 defines two symmetric retaining grooves 48 in the blocks 44. Each of the retaining grooves 48 communicates with the inner wall 406 and the outer wall 408 of the enclosure 40. An elastic portion 46 positioned in each guiding groove 49 extends inwardly towards the center of enclosure 40. One end of each of the elastic portions 46 is connected with the inner wall of the enclosure 40, and the other end thereof is tilted relative to the inner wall. Each of the elastic portions 46 may be at least partially received in a corresponding retaining groove 48 when the elastic portions 46 are pressed outwardly.

When assembled, the shaft portion 324 is inserted into the half-closed end 311 of the sleeve 31 so that the flange portion 322 is exposed through the opening 42 in the end of the sleeve 31. Then, the spring 33 and the cam 34 are placed around the shaft portion 324 in the order written and received in the sleeve 31. The protrusions 3422 are received in their respective notches 312. Then, the follower 35 is placed around the shaft portion 324, and the arms 356 are engaged in the recesses 3442 of the cam 34. Finally, the washer 36 is received in the receiving groove 358, and the cap 37 is locked in the ring groove 3242. Thus, the hinge assembly 30 is an integrated assembly.

Figure 6:
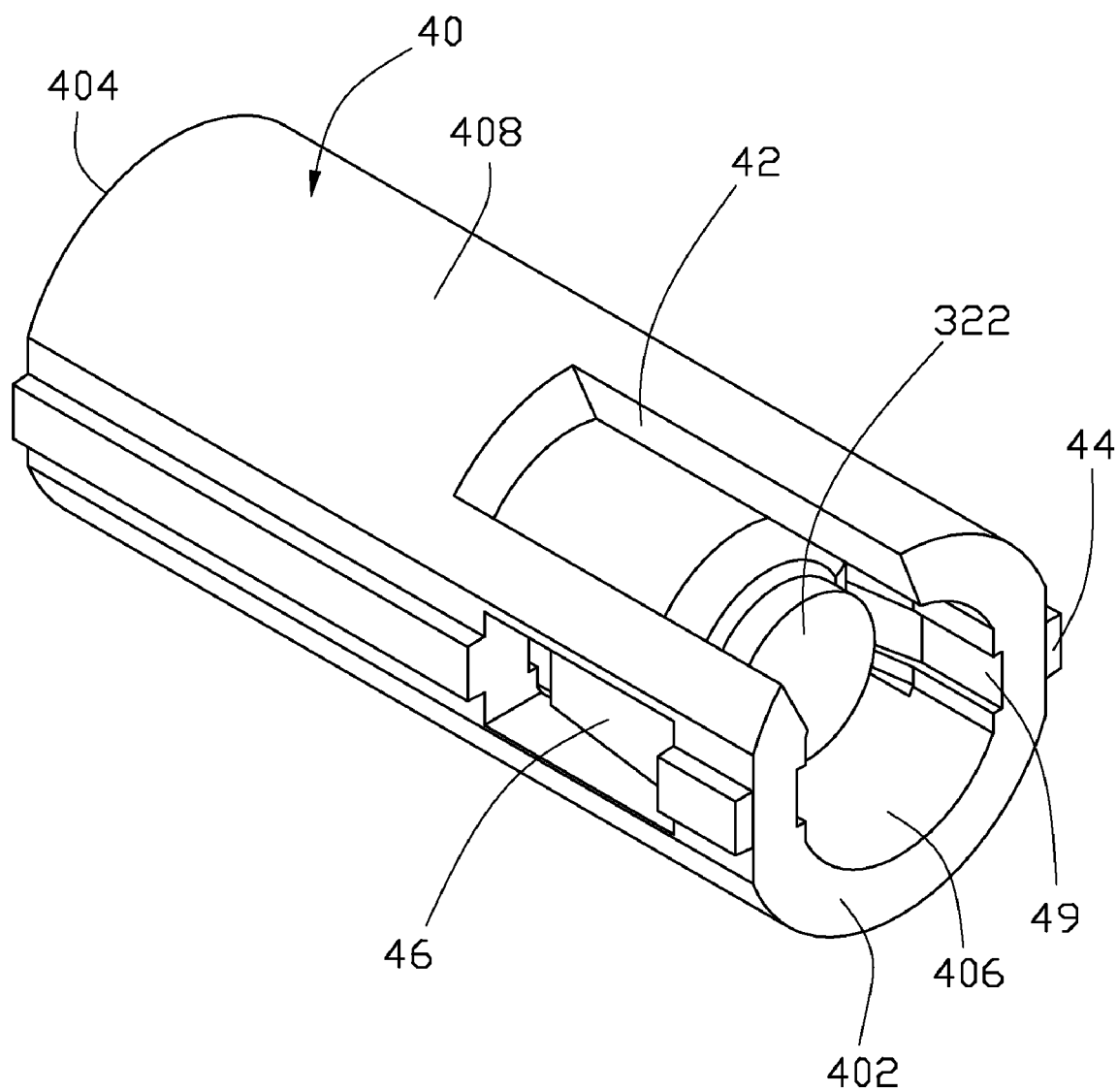
FIG. 6 is an assembled, isometric view of the hinge apparatus, showing the hinge assembly assembled in the enclosure.

Referring to FIG. 6, when the hinge assembly 30 is assembled in the enclosure 40, the follower 35 of the hinge assembly 30 is received in the enclosure 40 along the opening end 402. The projections 3522 of the follower 35 and the protrusion 3422 of the cam 34 are respectively received in the guiding grooves 49 of the enclosure 40. The sleeve 31 presses the two elastic portions 46, which are deformed into the retaining groove 48. Accordingly, the elastic portions 46 securely engage the hinge assembly 30 in the enclosure 40. Thus, the hinge assembly 30 and the enclosure 40 are also an integrated assembly.

Referring to FIG. 7, when the enclosure 40/hinge assembly 30 unit is assembled in the body section 20 of the foldable electronic device 100, the enclosure 40 is first aligned with the barrel 22. The blocks 44 of the enclosure 40 are slidably received in the slots 222 of the barrel 22. The cutout 224 of the barrel 22 corresponds to the enclosure opening 42. Accordingly, the flange portion 322 is exposed from the cutout 224 and the opening 42.

Figure 8:
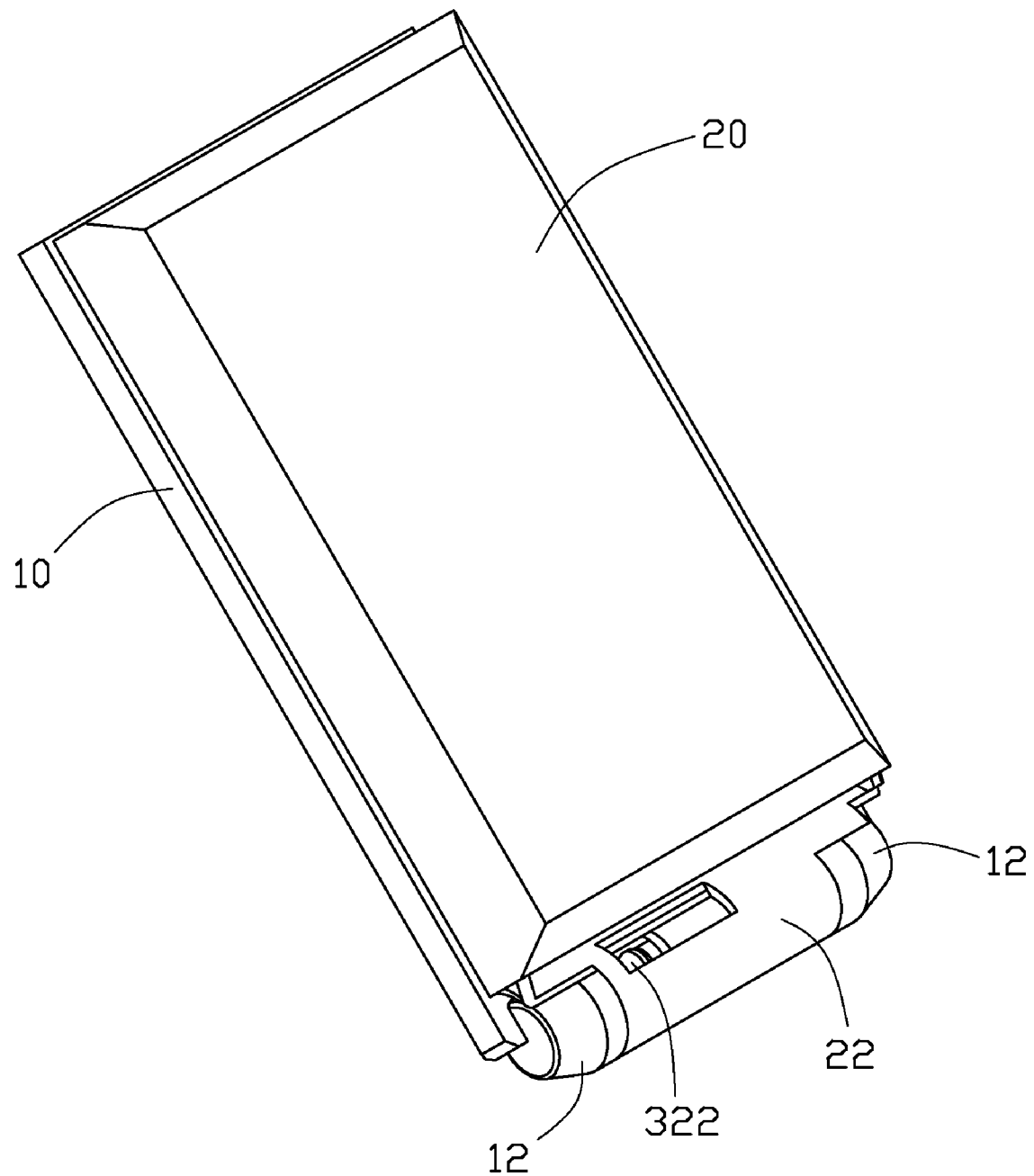
FIG. 8 is an assembled view of the hinge apparatus assembled in the electronic device.

Referring to FIG. 8, when the cover section 10 is engaged with the body section 20, the barrel 22 of the body section 20 is positioned between the holding ends 12 of the cover section 10. The flange portion 322 is pressed by a tool provided by the user to move, which causes the follower 35 to slide towards the latching groove 122. Thus, the follower 35 partially slides in the holding end 12, and the projections 3522 are engaged in the latching groove 122 of the holding end 12. Simultaneously, the sleeve 31 breaks away from the elastic force of the elastic portions 46. Thus, the flange portion 322 of the hinge assembly 30 are blocked by the distal ends of the elastic portions 46. Therefore, the hinge assembly 30 cannot move relative to the enclosure 40. The protrusions 3422 of the cam 34 pass through the notches 312 to engage in the guiding groove 49 of the enclosure 40. To avoid dust or water vapor entering into the barrel 22, an extra cover may be applied to cover the cutout 224 of the barrel 22 so as to protect the barrel 22. Accordingly, the foldable electronic device 100 is completely assembled.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention and the actual scope of the invention being defined by the appended claims.

What is claimed is:

1. A hinge apparatus comprising:
a hinge assembly including a sleeve;
an enclosure formed by a hollow cylinder, the hollow cylinder forming two elastic portions, the sleeve slidably received in the hollow cylinder, and the sleeve being clamped in the hollow cylinder between the elastic portions, the hollow cylinder defining a longitudinal opening configured for exposing a portion of the hinge assembly from the enclosure.

2. The hinge apparatus as claimed in claim 1, wherein the opening of the enclosure extends from an end of the enclosure towards the middle of the enclosure.

3. The hinge apparatus as claimed in claim 1, wherein the hollow cylinder includes an outer wall and an inner wall, the elastic portions are formed on the inner wall thereof.

4. The hinge apparatus as claimed in claim 3, wherein one end of the elastic portions is connected with the inner wall of the enclosure, and the other end is angled relative to the inner wall.

5. The hinge apparatus as claimed in claim 4, wherein the hollow cylinder defines two retaining grooves communicating with the outer wall and the inner wall, each elastic portion is partially received in a corresponding retaining groove.

6. A foldable electronic device comprising:
a body section including a barrel;
a cover section including two holding ends;
a hinge apparatus received in the barrel to connect the body section to the cover section, the hinge apparatus comprising:
a hinge assembly and an enclosure, the hinge assembly including a sleeve, the enclosure defining two retaining grooves and forming two elastic portions therein, each elastic portion partially received in a corresponding retaining groove, the hinge assembly slidably received in the enclosure, and the sleeve being clamped between the elastic portions, the enclosure defining an opening configured for exposing the hinge assembly from the enclosure.

7. The foldable electronic device as claimed in claim 6, wherein the opening extends from an end of the enclosure toward the middle of the enclosure.

8. The foldable electronic device as claimed in claim 6, wherein the enclosure includes an outer wall and an inner wall, the elastic portions are formed on the inner wall thereof.

9. The foldable electronic device as claimed in claim 8, wherein one end of the elastic portions is connected with the inner wall of the enclosure, and the other end thereof is angled relative to the inner wall.

* * * * *